US012544610B2

(12) United States Patent
Azari

(10) Patent No.: US 12,544,610 B2
(45) Date of Patent: Feb. 10, 2026

(54) SYSTEM FOR FIRE EXTINGUISHING

(71) Applicant: Hossein Azari, Tehran (IR)

(72) Inventor: Hossein Azari, Tehran (IR)

(*) Notice: Subject to any disclaimer, the term of this patent is extended or adjusted under 35 U.S.C. 154(b) by 230 days.

(21) Appl. No.: 18/393,937

(22) Filed: Dec. 22, 2023

(65) Prior Publication Data

US 2024/0316378 A1 Sep. 26, 2024

Related U.S. Application Data

(63) Continuation-in-part of application No. PCT/IB2022/055429, filed on Jun. 12, 2022.

(60) Provisional application No. 63/213,226, filed on Jun. 22, 2021.

(51) Int. Cl.
*A62C 35/10* (2006.01)
*A62C 35/02* (2006.01)

(52) U.S. Cl.
CPC ............ *A62C 35/10* (2013.01); *A62C 35/023* (2013.01)

(58) Field of Classification Search
CPC ....... A62C 35/10; A62C 35/023; A62C 35/13; A62C 35/02; A62C 37/11; A62C 37/40; A62C 99/0018; A62C 13/64; A62C 13/62; A62C 3/00
See application file for complete search history.

(56) References Cited

U.S. PATENT DOCUMENTS

| | | | | | |
|---|---|---|---|---|---|
| 4,064,944 | A * | 12/1977 | McClure | A62C 3/06 169/17 |
| 4,069,873 | A * | 1/1978 | McClure | A62C 3/06 169/56 |
| 10,398,915 | B2 * | 9/2019 | Boeke | A62C 99/0018 |

FOREIGN PATENT DOCUMENTS

| | | | | | |
|---|---|---|---|---|---|
| DE | 102015003034 | A1 * | 9/2015 | A62C 13/66 |
| EP | 2896432 | A1 * | 7/2015 | A62C 37/44 |
| JP | 2005118310 | * | 5/2005 | A62C 31/12 |

* cited by examiner

*Primary Examiner* — Christopher R Dandridge

(57) ABSTRACT

A fire extinguishing system that includes an extinguishing cylinder, a plurality of mist nozzles, a plastic fire detection tube, a first hydraulic tank, a hydraulic jack, and a second hydraulic tank. When the plastic fire detection tube is exposed to fire, the system actuates the extinguishing mechanism and pressurized water is jetted out toward the fire and therefore the fire is put out.

15 Claims, 3 Drawing Sheets

100

SYSTEM FOR FIRE EXTINGUISHING

CROSS-REFERENCE TO RELATED APPLICATION

This application is a continuation-in-part of PCT/IB2022/055429 filed on Jun. 12, 2022, and entitled "SYSTEM FOR FIRE EXTINGUISHING" which claims the benefit of priority from U.S. Provisional Patent Application Ser. No. 63/213,226, filed on Jun. 22, 2021, and entitled "AUTOMATIC DELUGE WATER MIST SYSTEM FOR FIRE FIGHTING OF FLOATING ROOF TANKS," which are both incorporated herein by reference in their entirety.

TECHNICAL FIELD

The present disclosure generally relates to fire control, and more particularly, relates to a system for reducing the spread of fire.

BACKGROUND ART

Fire and its varied uses are essential not only to day-to day living, but also impact ecological systems around the globe. For example, the positive effects and uses of fire may include, but not limited to, food preparation, heating, light, power, as well as stimulating growth and maintaining various environmental and ecological systems. However, fire may also be associated with some negative effects such as hazard to life and property, atmospheric pollution, and water contamination. Indeed, fire has the potential to cause physical damage to structures, buildings, individuals, and other things through burning, not to mention the economic and environmental ramifications of such.

For example, floating roof tanks are among systems that are utilized for minimizing fire spread risk. A floating roof tank is a storage tank commonly used to store large quantities of petroleum products such as crude oil or condensate. A floating roof tank, generally, consists of an open-topped cylindrical steel shell equipped with a roof that floats on the surface of the stored liquid.

Fire spread risk for floating roof tanks that contain flammable hydrocarbons has been a constant concern for this type of storage tanks. In floating roof tanks, a very small flame may spread and grow to a huge fire in a short period of time and may damage vulnerable and expensive equipment used there. Methods used to control fire spread, for example for floating roof tanks, are associated with some issues. For example, they are time consuming which may decrease the probability of controlling a dangerous and fast spreading fire.

Some automatic fire extinguishing systems have been developed to decrease the time of extinguishing process. One of these systems is a halogen gas-based system which has many disadvantages. For example, this system is easily displaceable by wind, does not have cooling effect, and may damage the ozone layer. Another type of systems for fire extinguishing are automatic foam extinguishing systems. These systems have also been unable to completely satisfy clients. The high maintenance cost, a need to replace foam solution every two years, leakage of actuation gas, and environmental problems have been among hindering disadvantages of these type of systems.

There is, therefore, a need for a fire extinguishing system that has a simple design to avoid complications so that it may protect the huge and expensive facilities for a long time without a need to regular maintenance. There is also a need for a system that is able to react automatically in few seconds so that it may be able to prevent the fire spread completely and successfully.

SUMMARY OF THE DISCLOSURE

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a fire extinguishing system. In an exemplary embodiment, the fire extinguishing system may include an extinguish cylinder, a plurality of mist nozzles, a plastic fire detection tube, a first hydraulic tank, a hydraulic jack, and a second hydraulic tank.

In an exemplary embodiment, the extinguish cylinder may include a top port. In an exemplary embodiment, a top section of the extinguish cylinder may be filled with a pressurized gas. In an exemplary embodiment, a bottom section of the extinguish cylinder may be filled with pressurized water. In an exemplary embodiment, the top port may be in fluid communication with the bottom section of the extinguish cylinder through a siphon tube.

In an exemplary embodiment, the plurality of mist nozzles may be connected to the top port of the extinguish cylinder through a first tube and a first ball valve. In an exemplary embodiment, the first ball valve may be configured to prevent fluid communication between the bottom section of the extinguish cylinder and the plurality of mist nozzles when the ball valve is closed. The first ball valve may further be configured to provide fluid communication between the bottom section of the extinguish cylinder and the plurality of mist nozzles when the ball valve is open.

In an exemplary embodiment, the plastic fire detection tube may be filled with a pressurization agent. In an exemplary embodiment, the plastic fire detection tube may be configured to be ruptured when the plastic fire detection tube is exposed to a fire. In an exemplary embodiment, a hole may be formed on the plastic fire detection tube when the plastic fire detection tube is ruptured. In an exemplary embodiment, the pressurization agent may be configured to jet out from the plastic fire detection tube and through the hole when the plastic fire detection tube is ruptured.

In an exemplary embodiment, a top section of the first hydraulic tank may be in fluid communication with the plastic fire detection tube. In an exemplary embodiment, the first hydraulic tank may contain a first amount of hydraulic oil at a bottom section of the first hydraulic tank.

In an exemplary embodiment, the hydraulic jack may include a cylinder and a piston. In an exemplary embodiment, the piston may be disposed slidably inside the cylinder. In an exemplary embodiment, a bottom section of the cylinder may be in fluid communication with the bottom section of the first hydraulic tank. In an exemplary embodiment, a first end of the piston may be connected to the first ball valve. In an exemplary embodiment, the piston may be configured to open the ball valve when the piston moves along a first axis and in a first direction.

In an exemplary embodiment, the second hydraulic tank may contain a second amount of hydraulic oil at a bottom section of the second hydraulic tank. In an exemplary embodiment, the bottom section of the second hydraulic tank may be in fluid communication with the top section of the cylinder.

In an exemplary embodiment, when the plastic fire detection tube is exposed to the fire, a pressure inside the first hydraulic tank may become low due to the pressurization agent jetting out from the plastic fire detection tube and through the hole. Furthermore, the piston may move along the first axis and in the first direction due to a pressure difference between the first hydraulic tank and the second hydraulic tank. Furthermore, the first ball valve may be opened due to the piston moving along the first axis and in the first direction.

In an exemplary embodiment, furthermore, the pressurized water may go from the bottom section of the extinguish cylinder toward the plurality of mist nozzles due to a pressure of the pressurized gas. Also, the pressurized water may be jetted out from the plurality of mist nozzles toward the fire.

In an exemplary embodiment, the fire extinguishing system may further include a second ball valve. In an exemplary embodiment, the plurality of mist nozzles may be connected to the top port of the extinguish cylinder through the first tube, the first ball valve, and the second ball valve. In an exemplary embodiment, the first ball valve and the second ball valve may be configured to prevent fluid communication between the bottom section of the extinguish cylinder and the plurality of mist nozzles when the first ball valve and the second ball valve are closed.

In an exemplary embodiment, the first ball valve and the second ball valve may further be configured to provide fluid communication between the bottom section of the extinguish cylinder and the plurality of mist nozzles when the first ball valve and the second ball valve are open.

In an exemplary embodiment, the first end of the piston may be connected to the second ball valve. In an exemplary embodiment, the piston may be configured to open the first ball valve and the second ball valve when the piston moves along the first axis and in the first direction. In an exemplary embodiment, when the plastic fire detection tube is exposed to the fire, the first ball valve and the second ball valve may be opened due to the piston moving along the first axis and in the first direction.

In an exemplary embodiment, the pressurization agent may include pure nitrogen, or a combination of nitrogen with some other gases. In an exemplary embodiment, the fire extinguishing system may further include a first connecting rod. In an exemplary embodiment, the first connecting rod may be interconnected between the first end of the piston and the first ball valve. In an exemplary embodiment, when the piston moves along the first axis and in the first direction, the first connecting rod may rotate in a first rotational direction.

In an exemplary embodiment, when the first connecting rod rotates in the first rotational direction, the first ball valve may be opened. In an exemplary embodiment, when the piston moves along the first axis and in a second direction, the first connecting rod may rotate in a second rotational direction. In an exemplary embodiment, when the first connecting rod rotates in the second rotational direction, the first ball valve may be closed.

In an exemplary embodiment, when the piston moves along the first axis and in a second direction, the first connecting rod may rotate in a second rotational direction. In an exemplary embodiment, when the first connecting rod rotates in the second rotational direction, the first ball valve may be closed.

In an exemplary embodiment, the second connecting rod may be interconnected between the first end of the piston and the second ball valve. In an exemplary embodiment, when the piston moves along the first axis and in the first direction, the second connecting rod may rotate in the first rotational direction. In an exemplary embodiment, when the second connecting rod rotates in the first rotational direction, the second ball valve may be opened.

In an exemplary embodiment, when the piston moves along the first axis and in the second direction, the second connecting rod may rotate in the second rotational direction. In an exemplary embodiment, when the second connecting rod rotates in the second rotational direction, the second ball valve may be closed.

In an exemplary embodiment, the first hydraulic tank and the second hydraulic tank may be attached to each other. In an exemplary embodiment, the fire extinguishing system may further include a plate between the first hydraulic tank and the second hydraulic tank. In an exemplary embodiment, the first hydraulic tank and the second hydraulic tank may be attached to each other through the plate. In an exemplary embodiment, the plate may include a small hole on the plate. In an exemplary embodiment, the small hole may be configured to provide fluid communication between the first hydraulic tank and the second hydraulic tank with a low flow rate.

In an exemplary embodiment, the fire extinguishing system may further include a third ball valve. In an exemplary embodiment, the third ball valve may be placed between the bottom section of the cylinder and the bottom section of the first hydraulic tank. In an exemplary embodiment, when the third ball valve is open, flow communication may be provided between the bottom section of the cylinder and the bottom section of the first hydraulic tank. In an exemplary embodiment, when the third ball valve is closed, flow communication may be prevented between the bottom section of the cylinder and the bottom section of the first hydraulic tank.

In an exemplary embodiment, the fire extinguishing system may further include a check valve placed between the bottom section of the cylinder and the bottom section of the first hydraulic tank and in parallel with the third ball valve. In an exemplary embodiment, the fire extinguishing system may further include a filter placed between the top port of the extinguish cylinder and the plurality of mist nozzles. In an exemplary embodiment, the filter configured to prevent entering small particles to the plurality of mist nozzles

BRIEF DESCRIPTION OF THE DRAWINGS

The drawing figures depict one or more implementations in accord with the present teachings, by way of example only, not by way of limitation. In the figures, like reference numerals refer to the same or similar elements.

DESCRIPTION OF EMBODIMENTS

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Figure 1:
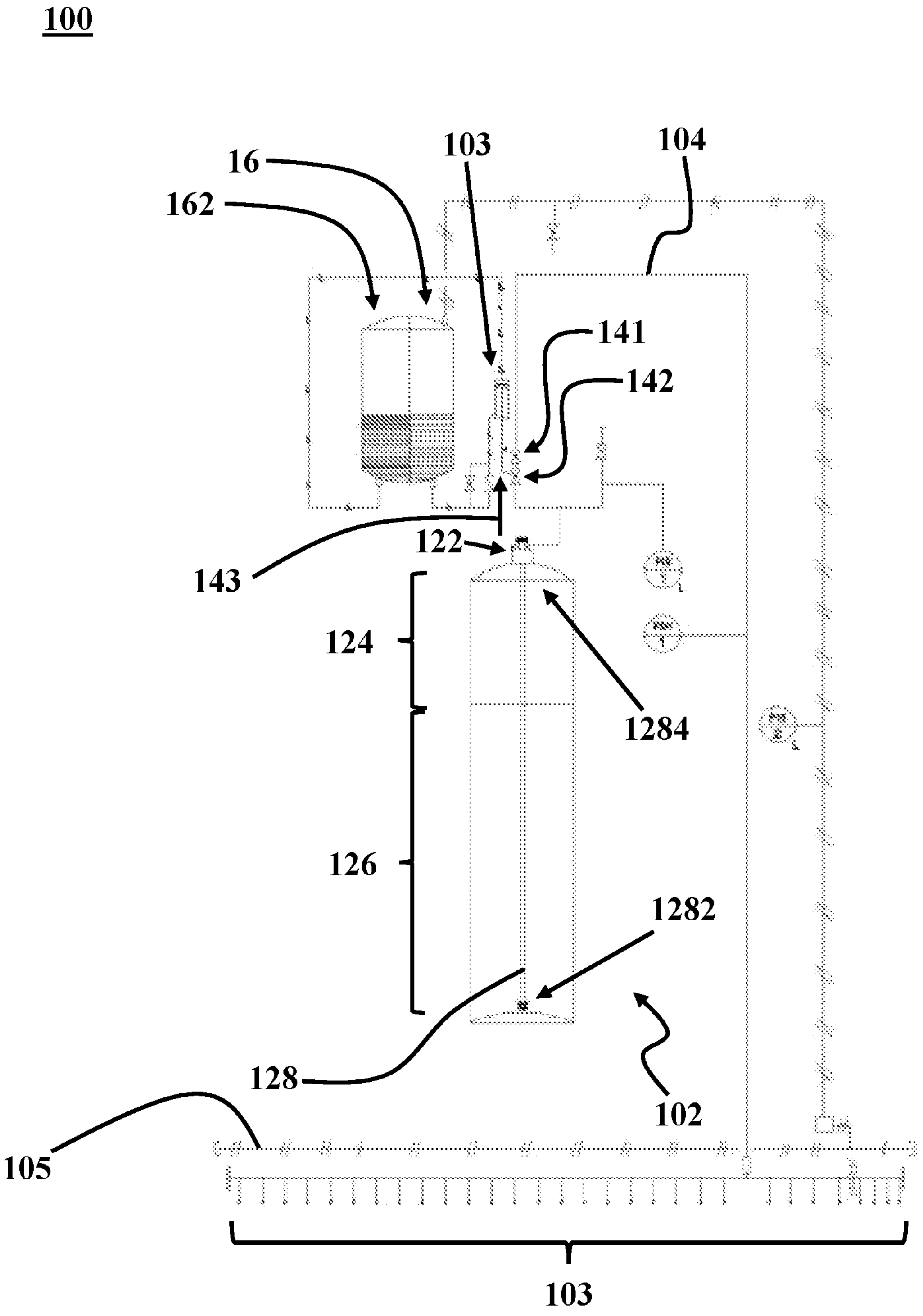
FIG. 1 illustrates a schematic diagram of a fire extinguishing system, consistent with one or more exemplary embodiments of the present disclosure.

The present disclosure is directed to exemplary embodiments of a system for extinguishing fire at a target location such as floating roof tanks. FIG. 1 shows a schematic diagram of a fire extinguishing system 100, consistent with one or more exemplary embodiments of the present disclosure. As shown in FIG. 1, in an exemplary embodiment, fire extinguishing system 100 may include an extinguish cylinder 102, that is, a device that may contain materials which may be used to extinguish fires. In an exemplary embodiment, extinguish cylinder 102 may include a top port 122. In an exemplary embodiment, top port 122 may refer to a port that is provided at a top end of extinguish cylinder 102. In an exemplary embodiment, the top end of extinguish cylinder 102 may denote the end that is, generally, positioned higher than the opposite end of extinguish cylinder 102. Nevertheless, extinguish cylinder 102 may be oriented in a way such that the top end of extinguish cylinder 102 is situated lower than the opposite end. In an exemplary embodiment, a top section 124 of extinguish cylinder 102 may be filled with a pressurized gas. In an exemplary embodiment, the pressurized gas may include different gases such as nitrogen. In an exemplary embodiment, a bottom section 126 of extinguishing cylinder 102 may be filled with pressurized water. In an exemplary embodiment, pressurized water may be charged into extinguishing cylinder 102 through top port 122 and then the pressurized gas may be charged into extinguishing cylinder 102 through top port 122. Therefore, top section 124 of extinguish cylinder 102 may be filled with the pressurized gas and bottom section 126 of extinguishing cylinder 102 may be filled with pressurized water. In an exemplary embodiment, top port 122 may be in fluid communication with bottom section 126 of extinguishing cylinder 102 through a siphon tube 128. In an exemplary embodiment, siphon tube 128 may be made out of plastic or any other material. In an exemplary embodiment, a length of siphon tube 128 may correspond to a length of extinguish cylinder 102. In an exemplary embodiment, the length of siphon tube 128 may be slightly shorter than the length of extinguish cylinder 102. In an exemplary embodiment, a first end 1282 of siphon tube 128 may be disposed inside bottom section 126 of extinguishing cylinder 102 and a second end 1284 of siphon tube 128 may be connected to top port 122. In an exemplary embodiment, an exemplary first end of siphon tube 128 may be open so that fluid can flow from bottom section 126 of extinguishing cylinder 102 into siphon tube 128. Consequently, top port 122 may be in fluid communication with bottom section 126 of extinguishing cylinder 102 as fluid may flow inside siphon tube 128.

As further shown in FIG. 1, in an exemplary embodiment, fire extinguishing system 100 may further include a plurality of mist nozzles 103. In an exemplary embodiment, plurality of mist nozzles 103 may be connected to top port 122 of extinguishing cylinder 102 through a first tube 104, a first ball valve 141, and a second ball valve 142. In an exemplary embodiment, a filter may be placed between top port 122 of extinguish cylinder 102 and plurality of mist nozzles 103. In an exemplary embodiment, the filter may be used to prevent small particles from entering plurality of mist nozzles 103. In an exemplary embodiment, first ball valve 141 and second ball valve 142 may be used to prevent fluid communication between bottom section 126 of extinguishing cylinder 102 and plurality of mist nozzles 103. In an exemplary embodiment, when first ball valve 141 and second ball valve 142 are closed, fluid communication may be prevented between bottom section 126 of extinguishing cylinder 102 and plurality of mist nozzles 103. In an exemplary embodiment, first ball valve 141 and second ball valve 142 may further be used to provide fluid communication between bottom section 126 of extinguishing cylinder 102 and plurality of mist nozzles 103. In an exemplary embodiment, when first ball valve 141 and second ball valve 142 are open, fluid communication may be provided between bottom section 126 of extinguishing cylinder 102 and plurality of mist nozzles 103. In an exemplary embodiment, each of first ball valve 141 and second ball valve 142 may include a Brass ball valve. It may be understood that Bass ball valves are a type of ball valves that use a perforated ball to control the flow of liquids and gases through a piping system. The perforated ball may be attached to a shaft that allows the perforated ball to rotate. When the perforated ball is in closed position, the perforated ball blocks the flow. When the perforated ball is in open position, the perforation in the ball allows the flow passing through the valve.

In an exemplary embodiment, utilizing pressurized water in bottom section 126 of extinguishing cylinder 102 and as the fire extinguisher may have some benefits. For example, whenever the pressurized water leaks from first ball valve 141 and/or second ball valve 142, this leakage may be detected easily. For example, this leakage may be seen by an operator easily. Therefore, whenever leakage occurs in first ball valve 141 and/or second ball valve 142, it may be detected easily and then it may be fixed soon. By this feature, a need for periodic maintenance and inspection for leakage prevention in the system may be obviated.

Figure 2:
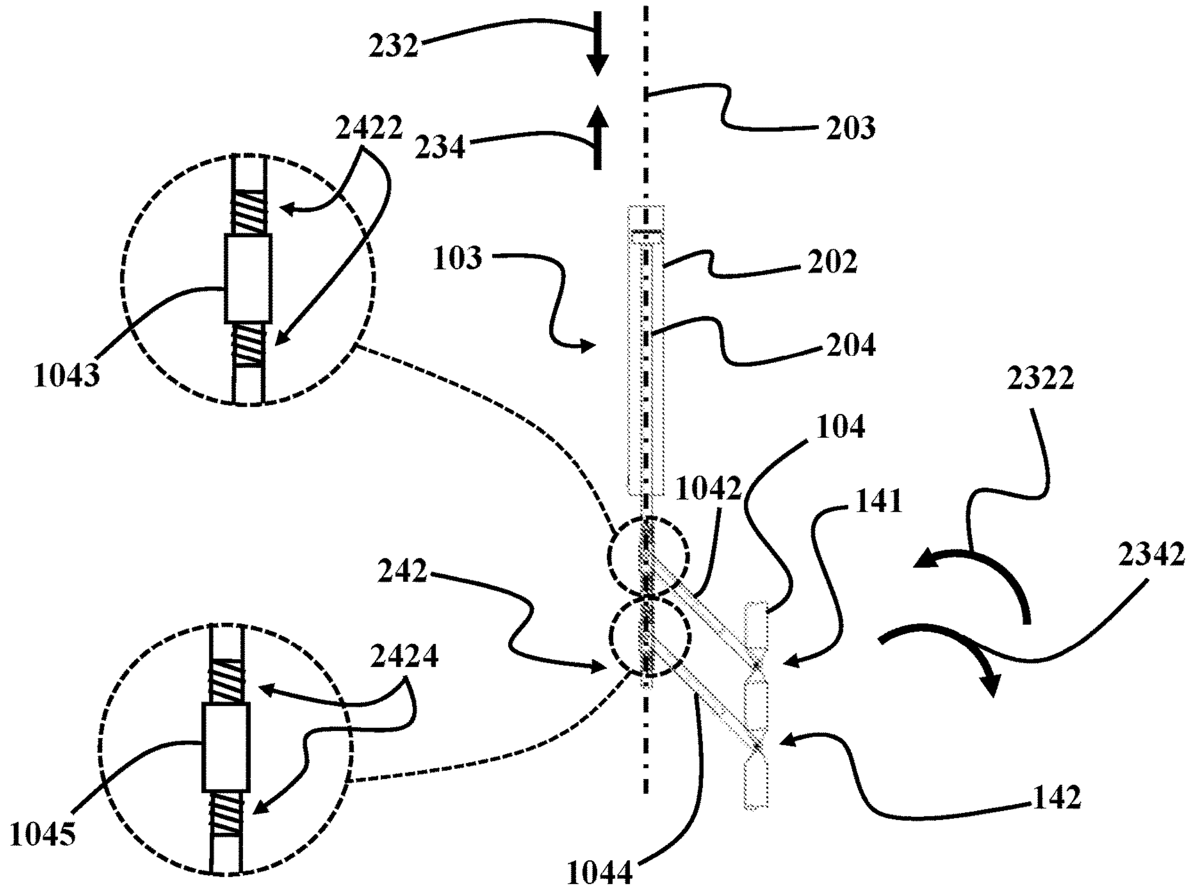
FIG. 2 illustrates a schematic diagram of a fire extinguishing system which provides detailed views of a first ball valve and a second ball valve, consistent with one or more exemplary embodiments of the present disclosure.

FIG. 2 shows a schematic of fire extinguishing system 100 which provides detailed views of first ball valve 141 and second ball valve 142, consistent with one or more exemplary embodiments of the present disclosure. As shown in FIG. 1 and FIG. 2, in an exemplary embodiment, fire extinguishing system 100 may further include a hydraulic jack 103. In an exemplary embodiment, hydraulic jack 103 may include a cylinder 202 and a piston 204. In an exemplary embodiment, piston 204 may be disposed slidably inside cylinder 202. In an exemplary embodiment, piston 204 may be disposed slidably inside cylinder 202 in such a way that piston 204 may be able to move linearly along a first axis 203.

In an exemplary embodiment, first ball valve 141 may be connected to a first end 242 of piston 204 by utilizing a first connecting rod 1042. In an exemplary embodiment, first connecting rod 1042 may be interconnected between first ball valve 141 and first end 242 of piston 204. In an exemplary embodiment, second ball valve 142 may be connected to first end 242 of piston 204 by utilizing a second connecting rod 1044. In an exemplary embodiment, second connecting rod 1044 may be interconnected between second ball valve 142 and first end 242 of piston 204. In an exemplary embodiment, when piston 204 moves along first axis 203 and in a first direction 232, first ball valve 141 and second ball valve 142 may become open and, therefore, a fluid may flow inside first tube 104 and through first ball valve 141 and second ball valve 142. In an exemplary embodiment, when piston 204 moves along first axis 203 and in first direction 232, first connecting rod 1042 may rotate in a first rotational direction 2322. In an exemplary embodiment, rotation of first connecting rod 1042 in first rotational direction 2322 may cause first ball valve 142 to be opened. In an exemplary embodiment, when piston 204 moves along first axis 203 and in first direction 232, second connecting rod 1044 may rotate in first rotational direction 2322. In an exemplary embodiment, rotation of second connecting rod 1044 in first rotational direction 2322 may cause second ball valve 144 to be opened.

In an exemplary embodiment, first connecting rod 1042 may be connected to piston 204 by utilizing a first coupler 1043. In an exemplary embodiment, first coupler 1043 may be used to couple piston 204 to first connecting rod 1042. In an exemplary embodiment, when piston 204 is coupled to connecting rod 1042, by linear movement of piston 204, first connecting rod 1042 may rotate in a clockwise direction and/or a counterclockwise direction and, thereby, first ball valve 142 may be closed or opened. In an exemplary embodiment, first connecting rod 1042 may be attached to first coupler 1043. In an exemplary embodiment, first end 242 of piston 204 may be disposed slidably inside first coupler 1043. In an exemplary embodiment, first coupler 1043 may be disposed between a first series of springs 2422 with a spring constant of $K_1$. In an exemplary embodiment, first series of springs 2422 may be attached to piston 204. In an exemplary embodiment, second connecting rod 1044 may be connected to piston 204 by utilizing a second coupler 1045. In an exemplary embodiment, second connecting rod 1044 may be attached to second coupler 1045. In an exemplary embodiment, first end 242 of piston 204 may be disposed slidably inside second coupler 1045. In an exemplary embodiment, second coupler 1045 may be disposed between a second series of springs 2424 with a spring constant of $K_2$. In an exemplary embodiment, second series of springs 2424 may be attached to piston 204.

In an exemplary embodiment, first coupler 1043 may be prevented from rotation around first axis 203. In an exemplary embodiment, first coupler 1043 may include a first pin on an inner surface of first coupler 1043. In an exemplary embodiment, piston 204 may include a first longitudinal slot on an outer surface of piston 204. In an exemplary embodiment, the first pin may be disposed slidably inside the first longitudinal slot. In an exemplary embodiment, the first pin and the first longitudinal slot may prevent rotational movements of first coupler 1043 around first axis 203.

In an exemplary embodiment, second coupler 1045 may be prevented from rotation around first axis 203. In an exemplary embodiment, second coupler 1045 may include a second pin on an inner surface of second coupler 1045. In an exemplary embodiment, piston 204 may include a second longitudinal slot on the outer surface of piston 204. In an exemplary embodiment, the second pin may be disposed slidably inside the second longitudinal slot. In an exemplary embodiment, the second pin and the second longitudinal slot may prevent rotational movements of second coupler 1045 around first axis 203.

In an exemplary embodiment, $K_1$ may be greater than $K_2$. For example, $K_1$ may be 1.5 times $K_2$. In an exemplary embodiment, $K_1$ being greater than $K_2$ may provide significant benefits. In an exemplary embodiment, if $K_1$ is greater than $K_2$, for example when $K_1$ is 1.5 times $K_2$, when piston 204 moves along first axis 203 and in a first direction 232, first ball valve 141 may be opened before second ball valve 142. For purpose of reference, it may be understood that as $K_2$ is smaller than $K_1$, responsive to downward movement of piston 204, second series of springs 2424 may resist less than first series of springs 2422 and, therefore, first connecting rod 1042 may experience greater rotational movement which may cause first ball valve 141 to be opened before second ball valve 142.

In an exemplary embodiment, fluid may be inclined to flow along a flow direction 143 inside first tube 104. Then, when the fluid is allowed to flow inside first tube 104, the fluid may first meet second ball valve 142 and then first ball valve 141. In an exemplary embodiment, if first ball valve 141 is opened before second ball valve 142, when fluid go through second ball valve 142 and reaches first ball valve 141, first ball valve 141 may already be open and, therefore, fluid pressure may not be applied to first ball valve 141 in a closed state of first ball valve 141. In an exemplary it may provide significant benefits. In an exemplary embodiment, it may ease the opening process for first ball valve 141. In an exemplary embodiment, it may cause the fluid to flow through first tube 104 in a shorter time which may help to put out the fire more rapidly. Also, it may help the system to have a longer lifetime.

In an exemplary embodiment, when piston 204 moves along second axis 203 and in a second direction 234, first ball valve 141 and second ball valve 142 may become closed and, therefore, a fluid may not be able to flow inside first tube 104 and through first ball valve 141 and second ball valve 142. In an exemplary embodiment, when piston 204 moves along first axis 203 and in second direction 234, first connecting rod 1042 may rotate in a second rotational direction 2342. In an exemplary embodiment, rotation of first connecting rod 1042 in second rotational direction 2342 may cause first ball valve 142 to be closed. In an exemplary embodiment, when piston 204 moves along first axis 203 and in second direction 234, second connecting rod 1044 may rotate in second rotational direction 2342. In an exemplary embodiment, rotation of second connecting rod 1044 in second rotational direction 2342 may cause second ball valve 144 to be closed.

In an exemplary embodiment, when piston 204 moves along first axis 203 and in a first direction 232, fluid communication may be provided between bottom section 126 of extinguishing cylinder 102 and plurality of mist nozzles 103. In an exemplary embodiment, when piston 204 moves along first axis 203 and in a second direction 234, first ball valve 141 and second ball valve 142 may become closed and, therefore, a fluid may not be able to flow inside first tube 104 and through first ball valve 141 and second ball valve 142. In an exemplary embodiment, when piston 204 moves along first axis 203 and in second direction 234, fluid communication may be prevented between bottom section 126 of extinguishing cylinder 102 and plurality of mist nozzles 103.

As further shown in FIG. 1, in an exemplary embodiment, fire extinguishing system 100 may further include a plastic fire detection tube 105. In an exemplary embodiment, plastic fire detection tube 105 may be filled with a pressurization agent. In an exemplary embodiment, the pressurization agent may include pure nitrogen, or a combination of nitrogen with some other gases. In an exemplary embodiment, when plastic fire detection tube 105 is exposed to fire, plastic fire detection tube 105 may be ruptured and, thereby, a hole may be formed on plastic fire detection tube 105. In an exemplary embodiment, when fire touches plastic fire detection tube 105, heat of the fire may melt the plastic which may lead to rupturing of plastic fire detection tube 105. In an exemplary embodiment, when plastic fire detection tube 105 is ruptured and the hole is formed on plastic fire detection tube 105, the pressurization agent may be jetted out from the hole and, therefore, the pressure in plastic fire detection tube 105 may become low. In an exemplary embodiment, a pressure of the pressurization agent in plastic fire detection tube 105 may be higher than the pressure outside of plastic fire detection tube 105. Therefore, in an exemplary embodiment, when plastic fire detection tube 105 is ruptured and the hole is formed on plastic fire detection tube 105, the pressurization agent may jet out from the hole due to the pressure difference between inside of plastic fire detection tube 105 and outside of plastic fire detection tube 105. In an exemplary embodiment, fire detection tube 105 may include a coating to absorb ultraviolet radiations.

Figure 3:
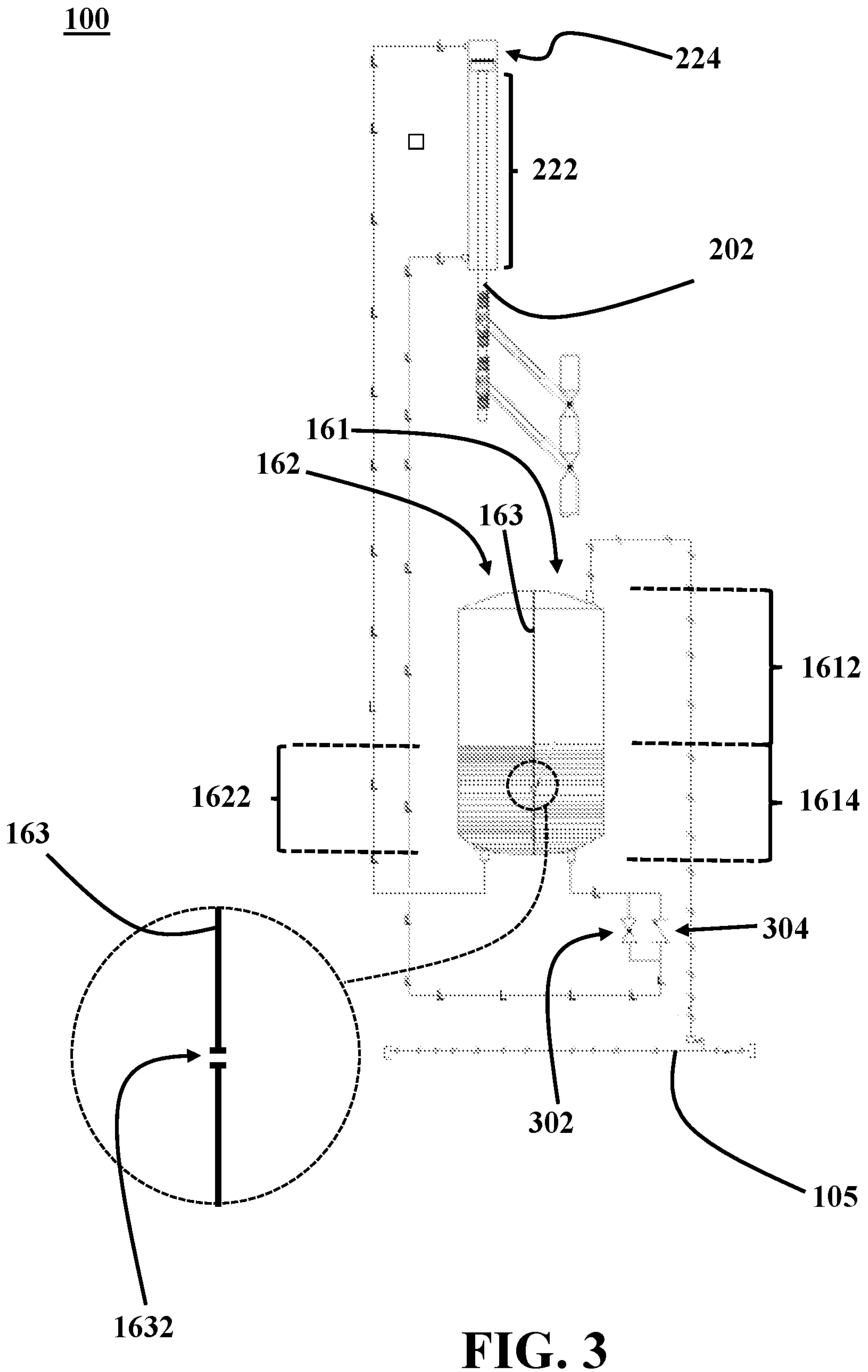
FIG. 3 illustrates a schematic diagram of a fire extinguishing system, consistent with one or more exemplary embodiments of the present disclosure.

FIG. 3 shows a schematic diagram of fire extinguishing system 100, consistent with one or more exemplary embodiments of the present disclosure. As shown in FIG. 1 and FIG. 3, in an exemplary embodiment, fire extinguishing system 100 may further include a first hydraulic tank 161. In an exemplary embodiment, a top section 1612 of first hydraulic tank 161 may be in fluid communication with plastic fire detection tube 105. In an exemplary embodiment, first hydraulic tank 161 may contain a first amount of a hydraulic oil at a bottom section 1614 of first hydraulic tank 161. In an exemplary embodiment, bottom section 1614 of first hydraulic tank 161 may be in fluid communication with a bottom section 222 of cylinder 202. In an exemplary embodiment, fire extinguishing system 100 may further include a third ball valve 302. In an exemplary embodiment, third ball valve 302 may be placed between bottom section 1614 of first hydraulic tank 161 and bottom section 222 of cylinder 202. In an exemplary embodiment, when third ball valve 302 is open, fluid communication may occur or may be provided between bottom section 1614 of first hydraulic tank 161 and bottom section 222 of cylinder 202. In an exemplary embodiment, when third ball valve 302 is closed, fluid communication may be prevented between bottom section 1614 of first hydraulic tank 161 and bottom section 222 of cylinder 202. In an exemplary embodiment, fire extinguishing system 100 may further include a check valve 304. In an exemplary embodiment, check valve 304 may be placed between bottom section 1614 of first hydraulic tank 161 and bottom section 222 of cylinder 202 and in parallel with third ball valve 302. In an exemplary embodiment, check valve 304 may help fire extinguishing system 100 to work more safely. In an exemplary embodiment, third ball valve 302 may be a normally closed valve.

In an exemplary embodiment, fire extinguishing system 100 may further include a second hydraulic tank 162. In an exemplary embodiment, second hydraulic tank 162 may contain a second amount of the hydraulic oil at a bottom section 1622 of second hydraulic tank 162. In an exemplary embodiment, bottom section 1622 of second hydraulic tank 162 may be in fluid communication with a top section 224 of cylinder 202. In an exemplary embodiment, first hydraulic tank 161 and second hydraulic tank 162 may be attached to each other and may be separated by a plate 163. In an exemplary embodiment, first hydraulic tank 161 and second hydraulic tank 162 may be created seamlessly to form an integrated part. In an exemplary embodiment, plate 163 may include a small hole 1632 on plate 163. In an exemplary embodiment, a diameter of small hole 1632 may be in a range between 1 mm and 2 mm. In an exemplary embodiment, small hole 1632 may be used to provide fluid communication between first hydraulic tank 161 and second hydraulic tank 162 with a relatively low flow rate. In an exemplary embodiment, due to the fact that fluid can pass through a hole between two chambers, fluid may pass through small hole 1632. Accordingly, small hole 1632 may be able to provide fluid communication between first hydraulic tank 161 and second hydraulic tank 162.

As discussed above, when a fire breaks out in somewhere around fire detection tube 105, plastic fire detection tube 105 may be ruptured and, thereby, a hole may be formed on plastic fire detection tube 105. In an exemplary embodiment, the pressurization agent may be jetted out from the hole and, therefore, the pressure in plastic fire detection tube 105 may become low. In an exemplary embodiment, when the pressure in plastic fire detection tube 105 becomes low, the pressure in first hydraulic tank 161 and second hydraulic tank 162 may become different. In fact, the pressure in first hydraulic tank may become lower than the pressure in second hydraulic tank 162. In an exemplary embodiment, the pressure difference in first hydraulic tank 161 and second hydraulic tank 162 may urge piston 204 to move along first axis 203 and in first direction 232. In an exemplary embodiment, when piston 204 moves along first axis 203 and in first direction 232, first ball valve 141 and second ball valve 142 may be opened and, therefore, the pressurized water may flow from bottom section 126 of extinguishing cylinder 102 due to a high pressure of the pressurize gas in top section 124 of extinguish cylinder 102. Then, in an exemplary embodiment, the pressurized water may be jetted out from plurality of mist nozzles 103 toward the fire and put out the fire.

Disclosed fire extinguishing system 100 is an environmentally friendly system with high reliability which may be used in different sensitive locations such as floating roof tanks, turbine and generator enclosures, engine room of marine vessels, and remote storage places. By utilizing, fire extinguishing system 100, it may be possible to put out a fire in a little time for example, less than 15 seconds. In an exemplary embodiment, fire extinguishing system 100 may be a simple and low cost system which may be able to be in service for a long time without a need to expensive periodic maintenance services. When an extinguishing system is used in harsh environments such as on the floating roof tanks, it may be vulnerable to deterioration and wear so it may need periodic maintenance services to ensure its safety but by utilizing fire extinguishing system 100, as discussed above, a need to these maintenance services may be obviated.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Ends 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “a” or “an” does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A fire extinguishing system, the fire extinguishing system comprising:

an extinguish cylinder comprising a top port, a top section of the extinguish cylinder filled with a pressurized gas, a bottom section of the extinguish cylinder filled with pressurized water, the top port in fluid communication with the bottom section of the extinguish cylinder through a siphon tube;

a plurality of mist nozzles, the plurality of mist nozzles connected to the top port of the extinguish cylinder through a first tube and, first ball valve, and a second ball valve, the first ball valve and the second ball valve configured to:

prevent fluid communication between the bottom section of the extinguish cylinder and the plurality of mist nozzles responsive to the first ball valve and the second ball valve being closed; and provide fluid communication between the bottom section of the extinguish cylinder and the plurality of mist nozzles responsive to the first ball valve and the second ball valve being open:

a plastic fire detection tube filled with a pressurization agent, the pressurization agent comprising nitrogen, the plastic fire detection tube configured to be ruptured responsive to the plastic fire detection tube being exposed to a fire, a hole being formed on the plastic fire detection tube responsive to the plastic fire detection tube being ruptured, the pressurization agent configured to jet out from the plastic fire detection tube and through the hole responsive to the plastic fire detection tube being ruptured;

a first hydraulic tank, a top section of the first hydraulic tank in fluid communication with the plastic fire detection tube, the first hydraulic tank containing a first amount of a hydraulic oil at a bottom section of the first hydraulic tank;

a hydraulic jack comprising a cylinder and a piston, the piston disposed slidably inside the cylinder and along a first axis, a bottom section of the cylinder in fluid communication with the bottom section of the first hydraulic tank, a first end of the piston connected to the first ball valve and the second ball valve, the piston configured to open the first ball valve and the second ball valve responsive to the piston moving along the first axis and in a first direction;

a second hydraulic tank, the first hydraulic tank and the second hydraulic tank attached to each other through a plate, the plate placed between the first hydraulic tank and the second hydraulic tank, the plate comprising a small hole on the plate, the small hole configured to provide fluid communication between the first hydraulic tank and the second hydraulic tank with a low flow rate, the second hydraulic tank containing a second amount of the hydraulic oil at a bottom section of the second hydraulic tank, the bottom section of the second hydraulic tank in fluid communication with a top section of the cylinder;

a first connecting rod, the first connecting rod interconnected between the first end of the piston and the first ball valve, responsive to movement of the piston along the first axis and in the first direction, the first connecting rod rotating in a first rotational direction, responsive to rotation of the first connecting rod in the first rotational direction, the first ball valve being opened, responsive to movement of the piston along the first axis and in a second direction, the first connecting rod rotating in a second rotational direction, responsive to rotation of the first connecting rod in the second rotational direction, the first ball valve being closed;

a second connecting rod, the second connecting rod interconnected between the first end of the piston and the second ball valve, responsive to movement of the piston along the first axis and in the first direction, the second connecting rod rotating in the first rotational direction, responsive to rotation of the second connecting rod in the first rotational direction, the second ball valve being opened, responsive to movement of the piston along the first axis and in the second direction, the second connecting rod rotating in the second rotational direction, responsive to rotation of the second connecting rod in the second rotational direction, the second ball valve being closed;

a third ball valve placed between the bottom section of the cylinder and the bottom section of the first hydraulic tank, responsive to the third ball valve being open, flow communication being provided between the bottom section of the cylinder and the bottom section of the first hydraulic tank, responsive to the third ball valve being closed, flow communication being prevented between the bottom section of the cylinder and the bottom section of the first hydraulic tank;

a check valve placed between the bottom section of the cylinder and the bottom section of the first hydraulic tank and in parallel with the third ball valve; and a filter placed between the top port of the extinguish cylinder and the plurality of mist nozzles, the filter configured to prevent entering small particles to the plurality of mist nozzles;

wherein responsive to the plastic fire detection tube being exposed to the fire:

a pressure inside the first hydraulic tank becomes low due to the pressurization agent jetting out from the plastic fire detection tube and through the hole;

the piston moves along the first axis and in the first direction due to a pressure difference between the first hydraulic tank and the second hydraulic tank;

the first ball valve and the second ball valve are opened due to the piston moving along the first axis and in the first direction;

the pressurized water flows from the bottom section of the extinguish cylinder toward the plurality of mist nozzles due to a pressure of the pressurized gas; and the pressurized water is jetted out from the plurality of mist nozzles toward the fire.

2. A fire extinguishing system, the fire extinguishing system comprising:

an extinguish cylinder comprising a top port, a top section of the extinguish cylinder filled with a pressurized gas, a bottom section of the extinguish cylinder filled with pressurized water, the top port in fluid communication with the bottom section of the extinguish cylinder through a siphon tube;

a plurality of mist nozzles, the plurality of mist nozzles connected to the top port of the extinguish cylinder through a first tube and a first ball valve, the first ball valve configured to:

prevent fluid communication between the bottom section of the extinguish cylinder and the plurality of mist nozzles responsive to the first ball valve being closed; and provide fluid communication between the bottom section of the extinguish cylinder and the plurality of mist nozzles responsive to the first ball valve being open:

a plastic fire detection tube filled with a pressurization agent, the plastic fire detection tube configured to be ruptured responsive to the plastic fire detection tube being exposed to a fire, a hole being formed on the plastic fire detection tube responsive to the plastic fire detection tube being ruptured, the pressurization agent configured to jet out from the plastic fire detection tube and through the hole responsive to the plastic fire detection tube being ruptured;

a first hydraulic tank, a top section of the first hydraulic tank in fluid communication with the plastic fire detection tube, the first hydraulic tank containing a first amount of a hydraulic oil at a bottom section of the first hydraulic tank;

a hydraulic jack comprising a cylinder and a piston, the piston disposed slidably inside the cylinder and along a first axis, a bottom section of the cylinder in fluid communication with the bottom section of the first hydraulic tank, a first end of the piston connected to the first ball valve, the piston configured to open the first ball valve responsive to the piston moving along the first axis and in a first direction; and a second hydraulic tank, the second hydraulic tank containing a second amount of the hydraulic oil at a bottom section of the second hydraulic tank, the bottom section of the second hydraulic tank in fluid communication with a top section of the cylinder;

wherein responsive to the plastic fire detection tube being exposed to the fire:

a pressure inside the first hydraulic tank becomes low due to the pressurization agent jetting out from the plastic fire detection tube and through the hole;

the piston moves along the first axis and in the first direction due to a pressure difference between the first hydraulic tank and the second hydraulic tank;

the first ball valve is opened due to the piston moving along the first axis and in the first direction;

the pressurized water flows from the bottom section of the extinguish cylinder toward the plurality of mist nozzles due to a pressure of the pressurized gas; and the pressurized water is jetted out from the plurality of mist nozzles toward the fire.

3. The fire extinguishing system of claim 2, further comprising a second ball valve, the plurality of mist nozzles connected to the top port of the extinguish cylinder through the first tube, the first ball valve, and the second ball valve, the first ball valve and the second ball valve configured to:

prevent fluid communication between the bottom section of the extinguish cylinder and the plurality of mist nozzles responsive to the first ball valve and the second ball valve being closed; and provide fluid communication between the bottom section of the extinguish cylinder and the plurality of mist nozzles responsive to the first ball valve and the second ball valve being open.

4. The fire extinguishing system of claim 3, wherein:

the first end of the piston is connected to the second ball valve;

the piston is configured to open the first ball valve and the second ball valve responsive to the piston moving along the first axis and in the first direction; and responsive to the plastic fire detection tube being exposed to the fire, the first ball valve and the second ball valve are opened due to the piston moving along the first axis and in the first direction.

5. The fire extinguishing system of claim 4, wherein the pressurization agent comprises nitrogen.

6. The fire extinguishing system of claim 5, further comprising:

a first connecting rod, the first connecting rod interconnected between the first end of the piston and the first ball valve, responsive to movement of the piston along the first axis and in the first direction, the first connecting rod rotating in a first rotational direction, responsive to rotation of the first connecting rod in the first rotational direction, the first ball valve being opened, responsive to movement of 29the piston along the first axis and in a second direction, the first connecting rod rotating in a second rotational direction, responsive to rotation of the first connecting rod in the second rotational direction, the first ball valve being closed; and a second connecting rod, the second connecting rod interconnected between the first end of the piston and the second ball valve, responsive to movement of the piston along the first axis and in the first direction, the second connecting rod rotating in the first rotational direction, responsive to rotation of the second connecting rod in the first rotational direction, the second ball valve being opened, responsive to movement of the piston along the first axis and in the second direction, the second connecting rod rotating in the second rotational direction, responsive to rotation of the second connecting rod in the second rotational direction, the second ball valve being closed.

7. The fire extinguishing system of claim 6, wherein the first hydraulic tank and the second hydraulic tank are attached to each other.

8. The first extinguishing system of claim 7, further comprising a plate between the first hydraulic tank and the second hydraulic tank, the first hydraulic tank and the second hydraulic tank being attached to each other through the plate.

9. The first extinguishing system of claim 8, wherein the plate comprises a small hole on the plate, the small hole configured to provide fluid communication between the first hydraulic tank and the second hydraulic tank with a low flow rate.

10. The fire extinguishing system of claim 9, further comprising a third ball valve placed between the bottom section of the cylinder and the bottom section of the first hydraulic tank, responsive to the third ball valve being open, flow communication being provided between the bottom section of the cylinder and the bottom section of the first hydraulic tank, responsive to the third ball valve being closed, flow communication being prevented between the bottom section of the cylinder and the bottom section of the first hydraulic tank.

11. The fire extinguishing system of claim 10, further comprising a check valve placed between the bottom section of the cylinder and the bottom section of the first hydraulic tank and in parallel with the third ball valve.

12. The fire extinguishing system of claim 11, further comprising a filter placed between the top port of the extinguish cylinder and the plurality of mist nozzles, the filter configured to prevent entering small particles to the plurality of mist nozzles.

13. The fire extinguishing system of claim 12, further comprising:

a first coupler interconnected between the first connecting rod and the first end of the piston, the first end of the piston disposed slidably inside the first coupler;

a first series of springs attached to the first end of the piston and the first coupler, a second coupler interconnected between the second connecting rod and the first end of the piston, the first end of the piston disposed slidably inside the second coupler; and a second series of springs attached to the first end of the piston and the second coupler.

14. The fire extinguishing system of claim 13, wherein:

the first series of springs has a spring constant of $K_1$;

the second series of springs has a spring constant of $K_2$; and $K_1$ is greater than $K_2$.

15. The fire extinguishing system of claim 14, wherein $K_1$ is 1.5 times $K_2$.

* * * * *